Jan. 30, 1934.  E. FRUHSTORFER  1,945,219

OBTURATING DISK

Filed Jan. 10, 1930

Inventor

Edgar Fruhstorfer,

By O. P. Wochaupler

Attorney

Patented Jan. 30, 1934

1,945,219

UNITED STATES PATENT OFFICE

1,945,219

OBTURATING DISK

Edgar Fruhstorfer, Paris, France, assignor to Isothermos Corporation of America, New York, N. Y., a corporation of Delaware Application January 10, 1930. Serial No. 419,907

4 Claims. (Cl. 286—5)

This invention relates to improvements in obturating or oil retaining devices adapted for use in connection with shafts or axles and their bearings to prevent oil which may escape from the bearings from creeping along the shafts or axles and thus being lost.

Heretofore, many forms of obturating or oil retaining devices have been devised for accomplishing the foregoing purpose, and in connection with more or less constant speed shafts or axles having stationary bearings the solution of the problem has been a comparatively simple matter. Where, however, the shafts or axles are subjected to harsh usage, and where the bearings are movable, as, for example, in the case of the axles of railway rolling stock, where it is extremely desirable to prevent escape of oil from the journal boxes, the solution of the problem presents great difficulties, due particularly to the great variations in speed at which the axles rotate and to their end play, combined with the shocks, jolts, tilting and centrifugal effects at curves, etc., incidental to railroad service.

Under conditions such as those last mentioned, rings shrunk on the axles, having cavities facing the bearings, either single or double, and with or without circular grooves in their peripheries, have proven most effective. It has been found, however, that within a certain intermediate speed range, the oil, due to the great molecular attraction between oil and metal surfaces, will gradually spread over the periphery of the ring and thus reach the side thereof remote from the bearing, where it is free to escape from the journal box.

The primary object of the present invention therefore is to provide an obturating or oil retaining device of such design that it is fully effective to prevent oil from creeping to the face thereof remote from the bearing at all operating speeds of the shaft or axle and despite shocks, jars, tilting, etc. to which the shaft or axle may be subjected in use.

Further, it is an object of the invention to provide an obturating or oil retaining device having the advantage mentioned and which is of exceptionally low production cost.

With the foregoing and other objects in view, the invention consists in the novel features of construction, combination and arrangement of parts as will be hereinafter more fully described, illustrated in the accompanying drawing and defined in the appended claims.

In the drawing, wherein like characters of reference denote corresponding parts in the related views:—

Figure 1:
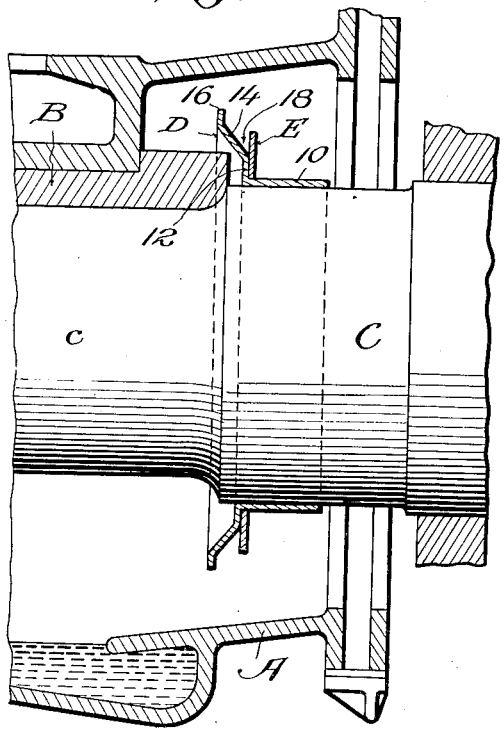
Figure 1 is a fragmentary longitudinal sectional view through a journal box, its bearing and an associated axle illustrating one embodiment of the invention.

Referring to the drawing in detail, A designates in each of the views, a portion of a journal box, B a journal bearing mounted therein, and C an axle inclusive of a journal portion $c$ seating against the bearing B. Oil is adapted to be supplied between the bearing B and the journal $c$ in any suitable manner not entering into the present invention and therefore not shown, since the problem here involved concerns solely the prevention of oil which escapes from between the axle and the bearing from creeping along the axle and being lost through the opening in the inner end of the box through which the axle extends.

Extensive and systematic experimentation has brought out the following facts:—

A flat disk fixed to the axle will, at all speeds of the axle at which centrifugal force overcomes the molecular attraction between oil and metal, throw the oil to the journal box walls surrounding the disk, from whence it may be led through suitable grooves to the oil reservoir within the box, so that, if the axle always rotated at high speed, a simple disk fixed to the axle would entirely suffice to prevent escape of oil from the box. Within a lower range of speed of the axle, however, the molecular attraction will be greater than the centrifugal force, and oil will tend to remain on the disk, only the surplus being thrown off at an angle depending on the speed. Under such conditions, oil will collect on the periphery of the disk and, due to gravity and adhesion, especially if the speed of the shaft is diminished, will flow or creep over the face of the disk remote from the bearing and thus escape from the box.

If now a second disk is fixed to the shaft in spaced relation to the first disk, and the distance between the disks is excessive, no advantage is gained because the oil will creep over the first disk, reach the shaft, and then pass over the second disk.

If, on the other hand, a second disk is provided and the disks are located too close to one another, again no advantage is gained because the molecular attraction is too great. In other words, the space between the disks will remain filled with oil, except at very high speeds of the axle, and the two disks will act just like a single disk.

If, however, the disks are spaced so that the distance is somewhere between the two extremes, the space between the disks will tend to become filled with oil, but as soon as a substantial ring of oil is formed, the surface film will be ruptured and the oil will be discharged by centrifugal force, because the core or center of the ring of oil is far enough removed from the adjacent surfaces of the disks to enable centrifugal force to overcome adhesion. A condition, of course, is that the diameters of the disks shall be sufficiently in excess of the diameter of the bottom of the annular trough, pocket or space between the disks so that the core or center of the ring of oil is sufficiently far removed from the bottom of the said trough, pocket or space to prevent adhesion between the oil and the said trough, pocket or space bottom from interfering with the action stated. Thus, even at low axle speeds, this combination of disks will effectively prevent the oil from passing the disk disposed farther from the bearing because the space between the two disks will never quite fill up, due to the oil which is discharged in a continuous stream from a point between the disks carrying with it the oil which otherwise would collect at the peripheries of the disks.

If the two disks should be of the same diameter, the ring of oil will, under the influence of centrifugal force, naturally burst in a plane midway between the disks. On the other hand, if one disk is of substantially greater diameter than the other, the discharge, due to adhesion, will occur nearer to the larger disk. For obvious reasons therefore, the preferable arrangement is to make the disk nearer the bearing of greater diameter than the other disk.

Structurally, the foregoing solution of the problem also represents a material improvement since the disks, which may be of sheet metal, are capable of being produced economically by stamping, and, of course, only one of them needs to be fastened by shrinking or in other suitable manner upon the shaft, since the other disk may be fastened to the first disk by riveting, welding or other manner, although both disks may be separately fastened to the axle if desired.

It may be found desirable in some instances to have the disk nearer the bearing dished so as to overhang the bearing, but this is not essential. On the other hand, one or the other or both of the disks may be of conical shape, but this also is not essential.

The correct distance between the peripheral portions of the disks and the minimum depth of the space between them may be calculated by mathematics, but the calculations would apply only to one grade of oil at one temperature and to one metal and to the particular proportion of the axle and the disks, and would involve the use of coefficients which are not definitely known. However, simple experiments will enable ready determination of the correct sizes of the disks and the spacing thereof to be employed in any particular instance.

Referring now to Fig. 1 of the drawing, it will be observed that the disk D nearer the bearing is of greater diameter than the disk E farther from the bearing and that only the disk D is fixed directly to the shaft, disk E being carried by disk D. In this particular embodiment of the invention, the disk D is inclusive of a hub portion 10 adapted to be shrunk or otherwise secured upon the shaft, a body portion 12 extending outwardly from the hub portion at right angles thereto, a flange portion 14 forming an outward continuation of the body portion 12 and deflected at a suitable angle in the direction of the bearing B so as to overhang the adjacent end of the latter, and a lip portion 16 forming a continuation of the flange portion 14 and disposed in a plane parallel to the plane of the body portion 12. The disk E on the other hand is flat and engaged over the hub 10 of the disk D and secured in any suitable manner against the body portion 12 of said disk D. Moreover, said disk E is of less diameter than the disk D and due to the aforesaid deflection of the flange portion 14 of the disk D an annular pocket 18 is formed between said disks into which oil is adapted to collect and from which it is adapted to be discharged in the manner aforestated.

Figure 2:
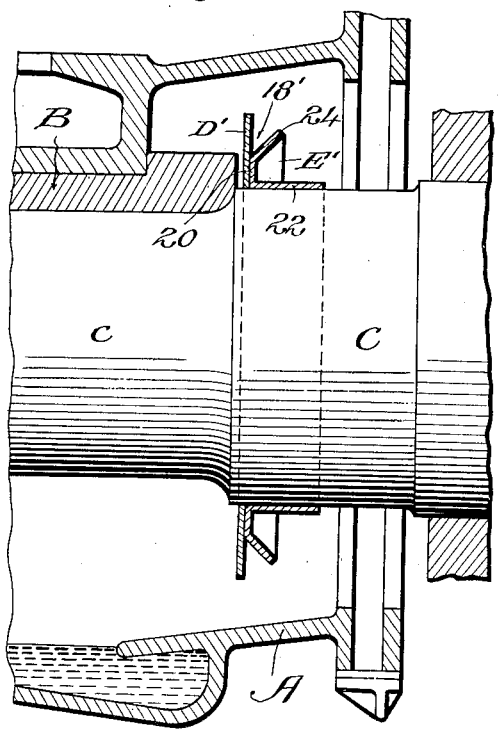
Figure 2 is a view similar to Fig. 1 illustrating another embodiment of the invention.

In Fig. 2 of the drawing the arrangement is very much the same as in Fig. 1. However, according to the embodiment of the invention illustrated in Fig. 2 the disk D' is continuously flat and suitably secured against a body portion 20 of the disk E', which body portion extends outwardly from a hub portion 22 of said disk E' which is suitably secured to the axle C. Moreover, the disk E' is inclusive of a flange portion 24 forming a continuation of the body portion 20 and deflected outwardly at a suitable angle with respect to the disk D' so as to provide between the disks an annular pocket 18' into which oil is adapted to collect and from which it is adapted to be discharged as in Fig. 1, it being noted in this connection that the disk D' is of greater diameter than the disk E'.

Figure 3:
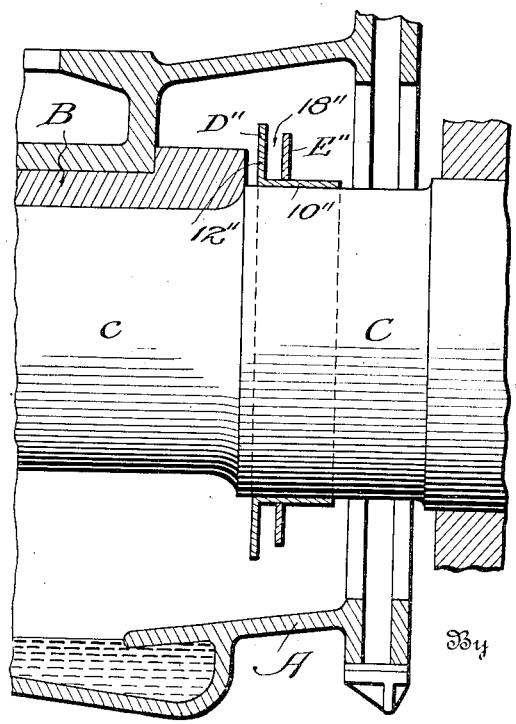
Figure 3 is a view similar to Figs. 1 and 2 illustrating still another embodiment of the invention.

The embodiment of the invention illustrated in Fig. 3 is similar to the embodiments illustrated in Figs. 1 and 2 and involves the use of a disk D'' like the disk D' in combination with a disk E'' like the disk E. In other words, the disk D'' is inclusive of a hub portion 10'' and an outwardly directed continuously flat body portion 12'' disposed at right angles to the hub portion, while the disk E'' is flat, engaged over the hub portion 10'' of the disk D'' and secured in spaced relation to the body portion 12'' of the disk D'' in any suitable manner, thereby providing an annular pocket 18'' between said disks into which oil is adapted to collect and from which it is adapted to be discharged in the manner aforesaid, the disk D'' in this embodiment of the invention being, as in the other embodiments, of greater diameter than the disk E''.

Without further description it is thought that the features and advantages of the invention will be readily apparent to those skilled in the art, and it will, of course be understood that changes in the form, proportion and minor details of construction may be resorted to, without departing from the spirit of the invention and scope of the appended claims.

I claim:—

1. In combination with a rotatable shaft and its bearing, means to prevent liquid lubricant from traveling along the shaft away from the bearing comprising a pair of disks secured to the shaft, said disks having spaced portions providing an annular liquid lubricant pocket therebetween, the distance between said spaced portions and the depth of said liquid lubricant pocket being such that with the use of liquid lubricant of any given consistency and the shaft rotating at any given angular velocity a ring of liquid lubricant contained in said pocket will be ruptured by centrifugal force before the pocket will become completely filled with liquid lubricant, the disk farther from the bearing being flared outwardly with respect to the disk nearer the bearing.

2. In combination with a rotatable shaft and its bearing, means to prevent liquid lubricant from traveling along the shaft away from the bearing comprising a disk inclusive of a cylindrical portion embracing the shaft, a portion extending outwardly from one end of said cylindrical portion and disposed in a plane at right angles to the axis of said cylindrical portion, a laterally extending portion forming an outward continuation of said second mentioned portion, and a second disk fitted over and secured to the cylindrical portion of said first mentioned disk, said second mentioned disk being of less diameter than said first mentioned disk, and the width and depth of the space between said second mentioned disk and the laterally extending portion of said first mentioned disk being such that with the use of liquid lubricant of any given consistency and the shaft rotating at any given angular velocity, a ring of liquid lubricant contained within said space will be ruptured by centrifugal force before the space may become completely filled with liquid lubricant.

3. In combination with a rotatable shaft and its bearing, means to prevent lubricant from traveling along the shaft away from the bearing comprising a disk inclusive of a cylindrical portion embracing the shaft, a portion extending outward from one end of said cylindrical portion, and a second disk fitted over and secured to the cylindrical portion of said first mentioned disk in spaced relation to the outer portion at least of said first mentioned disk, the width and the depth of the space between said disks being such that with the use of lubricant of any given consistency and rotation of the shaft at any given angular velocity, a ring of lubricant contained within said space will be ruptured by centrifugal force before the space will become completely filled with lubricant.

4. In combination with a rotatable shaft and its bearing, a device to prevent liquid lubricant from creeping along the shaft by discharging it away from the shaft by centrifugal force at various speeds of the shaft, comprising means carried by and rotatable with the shaft and having spaced flanges presenting peripheral edge portions terminating at different distances radially from the shaft, the edge portion located farthest from the shaft being nearest the bearing, the lateral spacing of said peripheral edge portions being in excess of the maximum spacing which will sustain a capillary column of the liquid lubricant, whereby the said edge lying farthest from the shaft will provide a major fluid adhering surface that will collect the liquid lubricant for discharge by centrifugal force at various speeds, and the edge disposed nearest the shaft will arrest capillary flow at low speeds, or when the shaft is at rest, to effect discharge of the liquid lubricant between the edges by gravity.

EDGAR FRUHSTORFER.